(12) United States Patent
Kubota

(10) Patent No.: US 11,153,449 B2
(45) Date of Patent: Oct. 19, 2021

(54) IMAGE FORMING APPARATUS AND METHOD OF DISPLAYING SETTING OF IMAGE FORMING APPARATUS

(71) Applicant: SHARP KABUSHIKI KAISHA, Sakai (JP)

(72) Inventor: Kazuhisa Kubota, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/909,180

(22) Filed: Jun. 23, 2020

(65) Prior Publication Data

US 2020/0412884 A1 Dec. 31, 2020

(30) Foreign Application Priority Data

Jun. 27, 2019 (JP) .............................. JP2019-120322

(51) Int. Cl.
*H04N 1/08* (2006.01)
*H04N 1/00* (2006.01)
*G06T 3/60* (2006.01)
*H04N 1/387* (2006.01)

(52) U.S. Cl.
CPC ............. *H04N 1/0044* (2013.01); *G06T 3/60* (2013.01); *H04N 1/00809* (2013.01); *H04N 1/3877* (2013.01)

(58) Field of Classification Search
CPC .......................... H04N 1/0044; H04N 1/3877
See application file for complete search history.

(56) References Cited

U.S. PATENT DOCUMENTS

| | | | | |
|---|---|---|---|---|
| 7,305,619 B2* | 12/2007 | Kaneda | ................ | G06K 9/3283 382/276 |
| 8,462,378 B2* | 6/2013 | Takeda | ................... | H04N 1/387 358/1.18 |
| 2009/0009788 A1* | 1/2009 | Mizobuchi | ........... | G03G 15/607 358/1.13 |

FOREIGN PATENT DOCUMENTS

JP 2009-017227 A 1/2009

* cited by examiner

*Primary Examiner* — Ibrahim Siddo
(74) *Attorney, Agent, or Firm* — ScienBiziP, P.C.

(57) ABSTRACT

A display processor of a controller extracts data such as images and characters from display data stored in a storage based on setting information stored in the storage, and displays a document orientation instructing pane and a 90-degree rotation operation icon in a document image operating pane on a display device. The display processor also displays a print preview image based on the document image data. When a rotation operation is performed through the 90-degree rotation operation icon, the document image data is also subjected to the same rotation process.

8 Claims, 14 Drawing Sheets

FINISH SETTING
PLEASE SELECT BINDING STYLE
(BINDING POSITION) OF COPIES

- PORTRAIT ORIENTATION
- LANDSCAPE ORIENTATION
- TWO-UP PRINT
- FOUR-UP PRINT

SET IMAGE IN THIS ORIENTATION

FIRST COPY TOP
DOCUMENT PREVIEW

SET IMAGE IN THIS ORIENTATION

FIRST COPY BOTTOM
DOCUMENT PREVIEW

OK

COINS INSERTED 500 YEN

◀ RETURN    PREPARATION ▷ *ENTER* ▶ PROCESSING ▷ END

IMAGE FORMING APPARATUS AND METHOD OF DISPLAYING SETTING OF IMAGE FORMING APPARATUS

BACKGROUND OF THE INVENTION

Field of the Invention

The present invention relates to an image forming apparatus that corrects the orientation of a read document when the document is to be printed through double-sided printing or aggregate printing, and a method of displaying a setting of the image forming apparatus. This Nonprovisional application claims priority under 35 U.S.C. § 119(a) on Patent Application No. 2019-120322 filed in Japan on 27 Jun. 2019, the entire contents of which are hereby incorporated by reference.

Description of the Background Art

A multifunction peripheral (MFP) installed in a convenience store has limited settings for documents and sheets. Specifically, as illustrated in FIGS. 14A and 14B, documents 510 and 520 are placed on an image reader 500 in a fixed orientation (for example, in a direction in which the longitudinal direction is the horizontal direction) and scanned. The document 510 has a portrait orientation, and the document 520 has a landscape orientation.

When performing double-sided copying using the MFP, the user places the document on an image reading portion of the MFP while taking into consideration the orientation of the document content and the binding position.

However, users of a convenience store are not always familiar with the MFP. Therefore, when placing a document on the image reader, the user may often not be sure about the orientation of the document to be placed. Japanese Unexamined Patent Application Publication No. 2009-17227 discloses a technique of providing guidance on how to place the front and back sides of documents for double-sided copying if the user inputs the orientation of the content and the desired binding position of the document.

However, in the conventional technique, it is difficult for a typical user to correctly comprehend whether the provided display/message is referring to the orientation of the content of the original document belonging to the user, the text direction of the documents (vertical text/horizontal text), the orientation of the documents placed for scanning, or the orientation of the sheets on which content of the documents is to be printed. It is also difficult to imagine how the printing on the front and back sides of sheets may differ depending on the binding position in double-sided printing. For this reason, the user may not be able to confirm the print result until the document is actually printed. Therefore, if an error in the orientation of the placed documents is confirmed after the documents are printed, it will be necessary to scan the documents all over again. This causes the operation by the user to be even more complicated and thereby causes unnecessary costs.

As described above, unlike office machines, multifunction peripherals installed in convenience stores only allow the original documents to be placed in a predetermined direction (for example, a lateral direction) regardless of the type of document, due to an agreement of the convenience store industry. Therefore, the placement of the documents becomes even more complicated, confusing the users.

An object of the present invention, which has been conceived in view of such a situation, is to provide an image forming apparatus and a method of displaying a setting of the image forming apparatus that indicates, on a menu, a scanned document image and the correct document orientation corresponding to a finish setting of printing, so as to allow the user to readily correct the direction of the document image.

SUMMARY OF THE INVENTION

An aspect of the present invention provides an image forming apparatus including a reader, operating device, a display device, an image forming device, and a controller.

The reader reads a document and generates document image data.

The operating device performs a finish setting for setting of an orientation of a document image in accordance with the orientation of the document and a binding position, and an operation for correcting the orientation of the document image.

The display device performs displaying of a document orientation instruction for instructing the orientation of the document image to be printed and performs displaying of a print preview image for indicating the orientation of the document image.

The image forming device forms an image based on the document image data on a recording sheet in the orientation of the document image indicated by the print preview image.

The controller controls the display device and the image forming device in accordance with an operation input from the operating device.

The controller causes the display device to perform the displaying of the document orientation instruction corresponding to the finish setting set by the operating device and to display the print preview image.

In another aspect of the present invention, when an operation of correcting the orientation of the print preview image is performed on the display device by the operating device, the controller corrects the orientation of the print preview image in accordance with the operation of correcting, displays the print preview image, and corrects the orientation of the document image data.

The displaying of the document orientation instruction may be an icon indicating the document orientation or a combination of an icon indicating a document orientation and characters describing the document orientation.

The finish setting may be a setting related to the finish of double-sided printing or a setting related to the finish of aggregate printing.

An aspect of the present invention provides a method of displaying a setting of an image forming apparatus. The image forming apparatus includes a reader, operating device, a display device, an image forming device, and a controller.

The reader reads a document and generates document image data.

The operating device performs a finish setting for setting of an orientation of a document image in accordance with the orientation of the document and a binding position, and an operation for correcting the orientation of the document image.

The display device performs displaying of a document orientation instruction for instructing the orientation of the document image to be printed and performs displaying of a print preview image for indicating the orientation of the document image.

The image forming device forms an image based on the document image data on a recording sheet in the orientation of the document image indicated by the print preview image.

The controller controls the display device and the image forming device in accordance with an operation input from the operating device.

The method includes causing, by the controller, the display device to perform the displaying of the document orientation instruction corresponding to the finish setting set by the operating device and to display the print preview image.

In another aspect of the present invention, the method of displaying a setting of an image forming apparatus, according to claim 7, the method further includes, when an operation of correcting the orientation of the print preview image is performed on the display device by the operating device, correcting the orientation of the print preview image in accordance with the operation of correcting by the controller, displaying the print preview image by the controller, and correcting the orientation of the document image data by the controller.

According to the present invention, when the user sets the finish setting of the document orientation and the binding position, an instruction for the document orientation corresponding to the setting and a print preview image of the document read by the reader are displayed. Therefore, even if the user does not understand the mechanism of the image forming device, the user can immediately recognize an error in the orientation of the scanned document.

By performing an operation of correcting on a print preview image on a display device, a print preview image that reflects the operation of correcting is displayed, and the orientation of the document image data is also corrected. Therefore, the user can correct the orientation on a menu on the display device, and readily confirm whether the orientation is corrected. Therefore, even if the orientation of the scanned document image is incorrect, there is no need to re-scan the document for printing. This increases the efficiency of the process and prevents unnecessary costs.

BRIEF DESCRIPTION OF THE DRAWINGS

FIG. 5 is a diagram illustrating a document orientation setting determination menu on the display device of the image forming apparatus according to the first embodiment;

FIG. 13 is a diagram illustrating a menu after operation of the document image operating pane on the display device of the image forming apparatus in the second embodiment.

DESCRIPTION OF THE PREFERRED EMBODIMENTS

Embodiments of the present invention will now be described with reference to the accompanying drawings. Note that the following embodiments are examples for explaining the present invention, and the technical scope of the invention described in the claims is not limited to the following description.

First Embodiment

Outline

Figure 1:
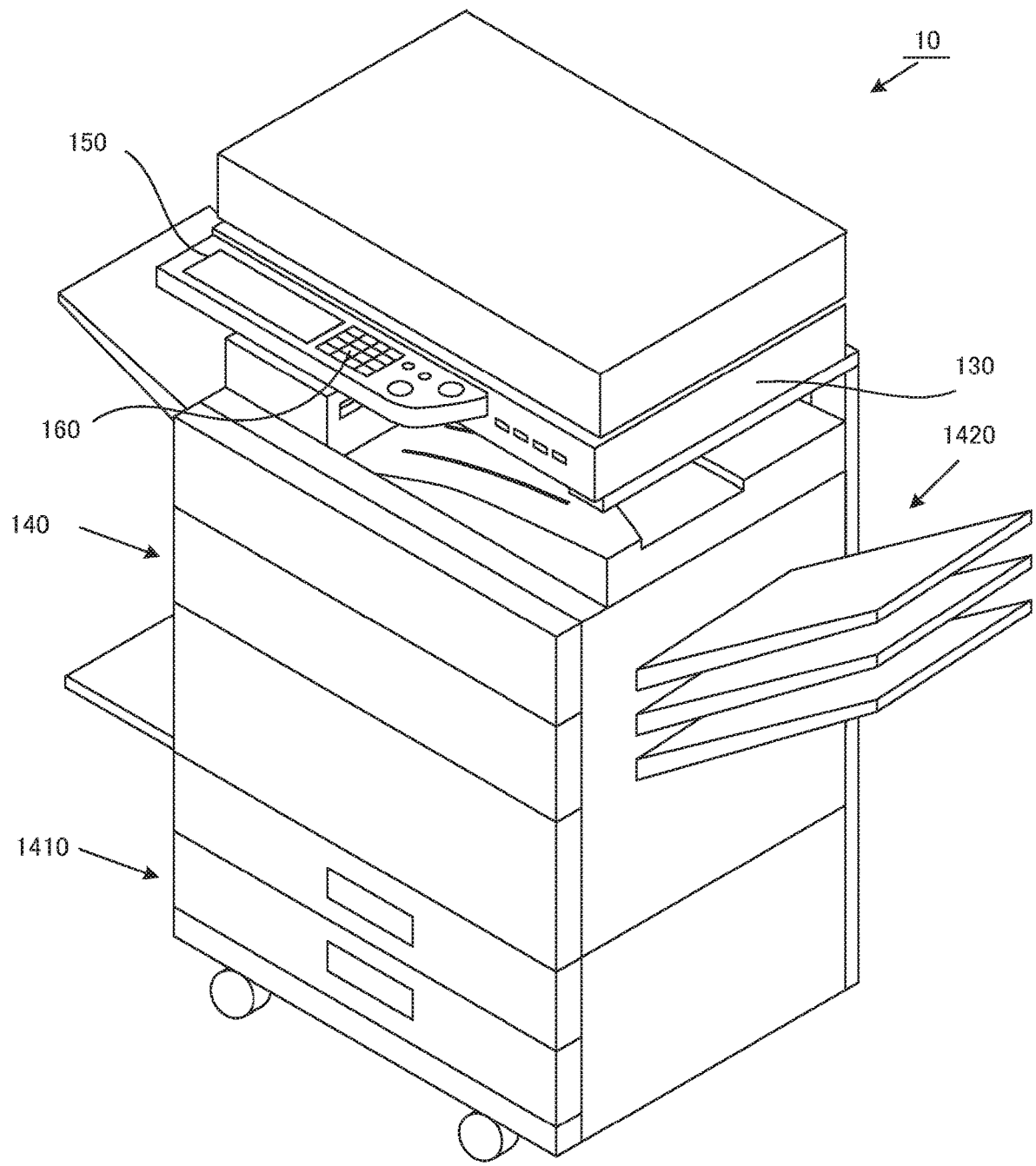
FIG. 1 is an external perspective view of an image forming apparatus according to a first embodiment.
Figure 2:
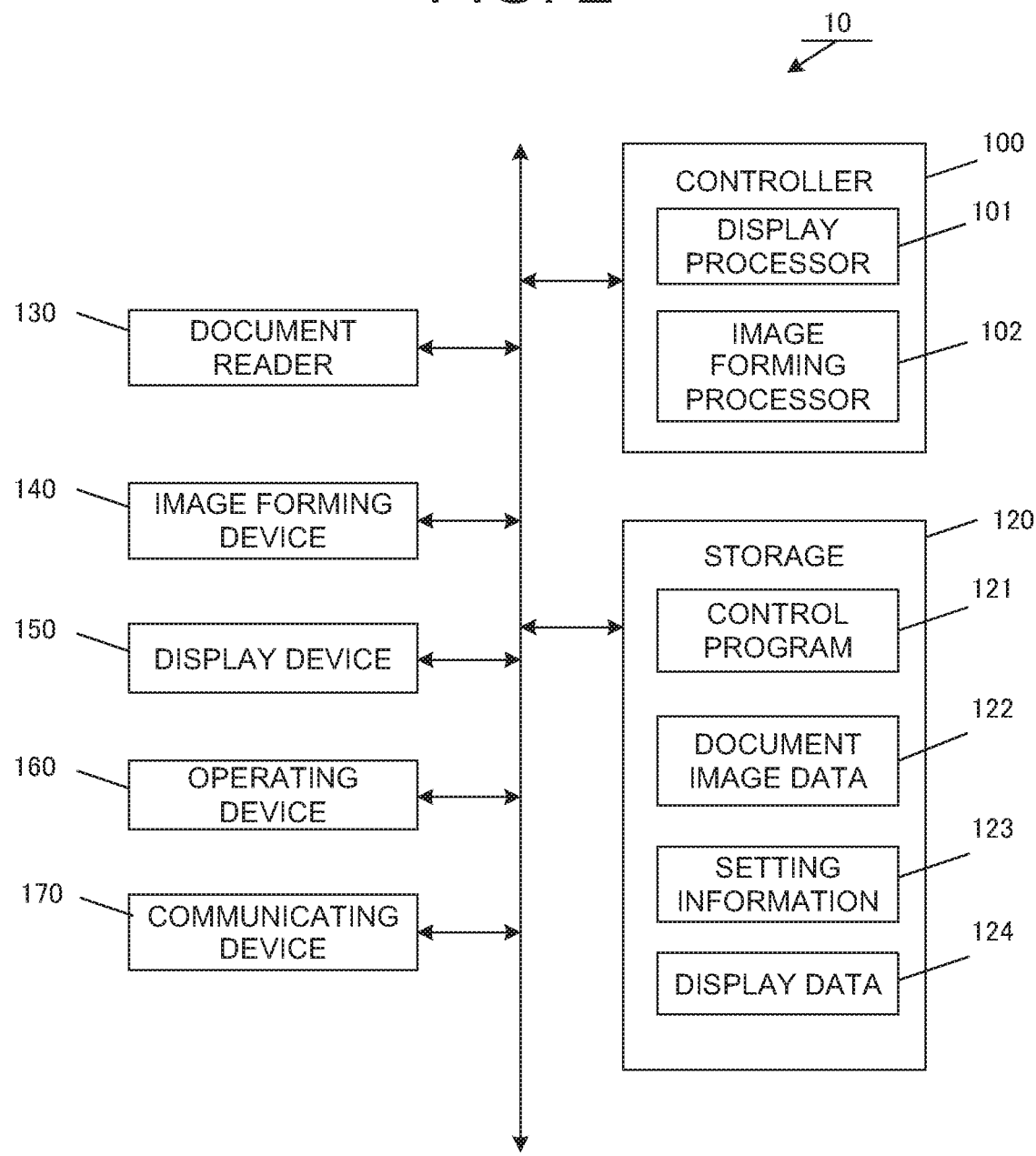
FIG. 2 is a block diagram illustrating the image forming apparatus according to the first embodiment.

The outline of an image forming apparatus 10 will now be described. FIG. 1 is a schematic perspective view of the exterior of the image forming apparatus 10. FIG. 2 is a block diagram illustrating the image forming apparatus 10.

The image forming apparatus 10 illustrated in FIG. 1 is a multifunction peripheral (MFP) that is installed in a convenience store or the like. The image forming apparatus 10 has multiple modes. The image forming apparatus 10 according to this embodiment has the following modes.

The modes enable the image forming apparatus 10 to provide a typical copy function, a typical facsimile function, and a typical scanner function. For example, the image forming apparatus 10 in copy mode can execute a copy job.

A copy job will now be briefly described. A document is placed in a document reader 130. A copy operation is performed by the operating device 160. The user can check the settings for document size and paper size, and the copy settings on a display device 150. Such settings include, for example, single-sided printing, double-sided printing, aggregate printing settings, etc.

When the user operates the copy start from the operating device 160, the copy process is executed. Specifically, the document reader 130 reads the document placed by the user. A controller 100 described below generates image data from the document read by the document reader 130.

The image forming device 140 generates an image based on the image data on a sheet transported from a sheet tray 1410 and outputs the sheet to an output tray 1420. In this embodiment, the term "sheet" refers to a recording sheet on which an image is to be formed. A sheet may include not only plain paper but also various paper media, such as thick paper and glossy paper, and film etc., if images can be formed thereon.

When the image forming apparatus 10 is in a facsimile mode, the image forming apparatus 10 can execute a facsimile job. The facsimile job will now be briefly described.

When facsimile transmission is to be performed, a document is placed in the document reader 130, and a facsimile transmission operation is performed by the operating device 160. The user can check the set document size and transmission settings (facsimile number or the destination and the like) on the display device 150.

When the user operates the operating device 160 to start the facsimile transmission, the facsimile process is executed. The controller 100 described below uses the communicating device 170 to perform a communication procedure for the destination. When the transmission-enabled state is secured, the controller 100 performs necessary processing, such as changing the compression format of a compressed file, and then sequentially transmits the compressed file to the destination via a communication line.

When a facsimile is received, the controller 100 receives the compressed file sent from the destination while performing the communication procedure by the communicating device 170, and decompresses the received compressed file by a compression/decompression device (not illustrated). The controller 100 performs various types of image processing on the image data and outputs the processed image data to the image forming device 140. The image forming device 140 forms an output image on the recording sheet on the basis of the output image data.

When the image forming apparatus 10 is in a scanner mode, the image forming apparatus 10 can execute a scanner job. The scanner job will now be briefly described.

A document is placed in a document reader 130. A scanner operation is performed by the operating device 160. The user can check the set document size and output image settings (image file type, etc.) on the display device 150.

When the user operates the operating device 160 to start the scanner operation, the scanner process is executed. Specifically, the document reader 130 reads the document placed by the user. The controller 100 described below generates image data from the document read by the document reader 130.

Functional Configuration

The functional configuration of the image forming apparatus 10 will now be described with reference to FIG. 2.

The controller 100 is a functional section for comprehensive control of the image forming apparatus 10. The controller 100 reads and executes a control program 121 stored in a storage 120, to provide various functions. The controller 100 includes at least one computing device (e.g., a central processing unit (CPU)). The functions realized by the controller 100 will now be described.

The controller 100 realizes a copy function in the copy mode. The controller 100 includes a display processor 101 that controls the display device 150 and an image forming processor 102 that controls the image forming device 140. The display processor 101 performs a process of displaying for operation on the display device 150 at the time of print settings. For example, the displaying regarding the setting operation is displayed on the display device 150 in such a manner to facilitate the operation by the user (details will be described below).

Similarly, the facsimile mode and the scan mode are both realized by the controller 100. At the time of print settings, the displaying regarding the setting operation is displayed on the display device 150 in such a manner to facilitate the operation by the user, as in the copy mode described above.

The copy function, the facsimile function, and the scanner function are functions that are executed in a typical multi-function peripheral. The operations and processes are known techniques and can be realized through known processes.

Each function can be realized by referring to and using the inventions disclosed in, for example, Japanese Unexamined Patent Application Publication No. 2017-216540 (Title of the Invention: Image Processing Apparatus, Image Forming Apparatus, Program, and Recording Medium) and Japanese Unexamined Patent Application Publication No. 2017-158210 (Title of the Invention: Image Transmitting Apparatus, Image Transmission Method, And Image Forming Apparatus Including the Image Transmitting Apparatus).

The storage 120 is a functional section that stores programs and data. The storage 120 includes, for example, a semiconductor storage, such as a solid-state drive (SSD), or a hard disk drive (HDD).

The storage 120 stores the control program 121, document image data 122 read by the document reader 130, setting information 123 input by the operating device 160, and display data 124, such as images and characters, to be displayed on the display device 150.

The control program 121 is a program regarding operation control of the image forming apparatus 10.

The document image data 122 is image data of the document read the document reader 130.

The setting information 123 is various items of setting information input by the user through the operating device 160.

The display data 124 is display information regarding the operation of the image forming apparatus 10. Here, the display data 124 is instruction images and characters, which correspond to the finish settings in document printing, such as icons, displayed on the display device 150.

The document reader 130 reads a document image and generates image data. For example, the document reader 130 is composed of a scanner including a device for converting optical information to electric signals, such as a contact image sensor (CIS) or a charge coupled device (CCD).

For example, the document reader 130 reads a document placed on the placing table within a range set depending on the document size and outputs image data. Note that the document may be placed on the placing table or an automatic document feeder (ADF). In this embodiment, the document is to be placed on the placing table.

Figure 14A:
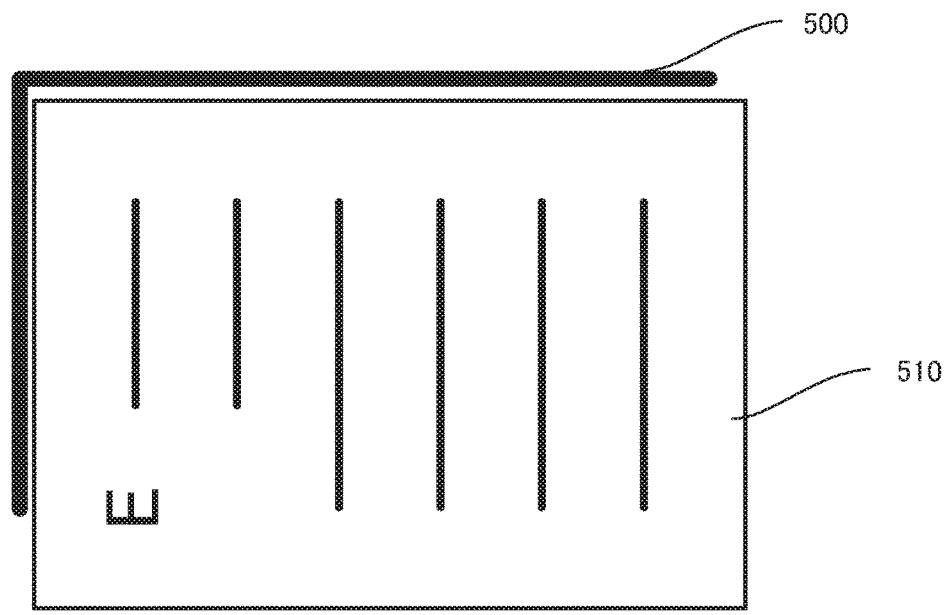
FIGS. 14A and 14B are diagrams illustrating a document placed on a placing table.
Figure 14B:
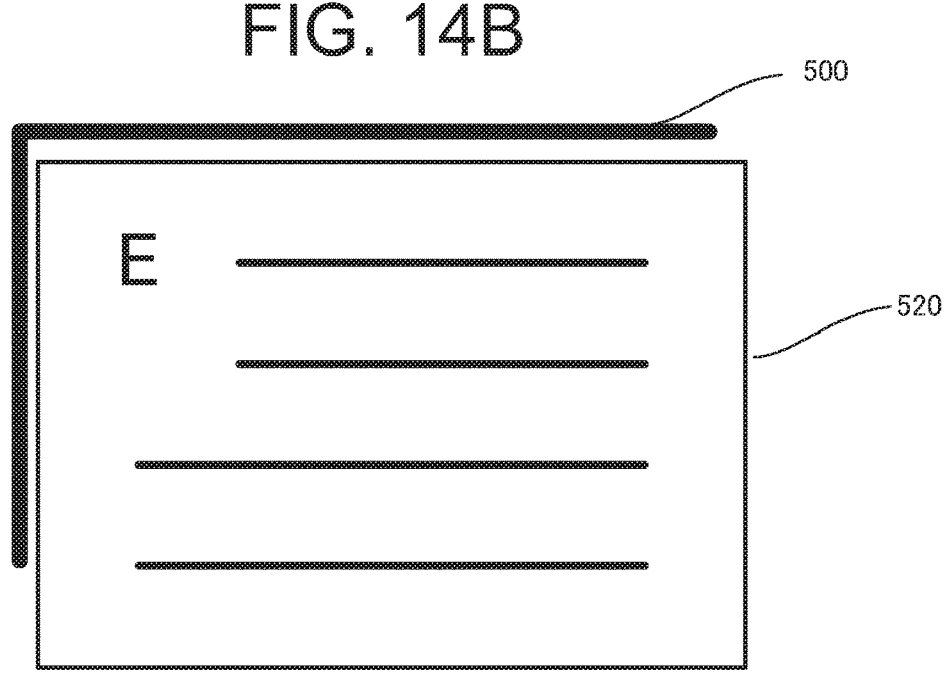

In this embodiment, a document is placed on the document reader 130 in a landscape orientation as illustrated in FIGS. 14A and 14B.

The image forming device 140 is a functional section for forming an image of image data on a recording medium, such as a recording sheet. For example, a recording sheet is fed from a sheet tray 1410 illustrated in FIG. 1, an image is formed on the surface of the recording sheet at the image forming device 140, and then the recording sheet is output into an output tray 1420. The image forming device 140 includes, for example, an electrophotographic laser printer.

At least one paper tray 1410 is usually provided and holds sheets.

The display device 150 displays various states of the image forming apparatus 10 and operation input states. For example, the display device 150 includes a liquid crystal display (LCD), an organic electroluminescent (EL) panel, electronic paper using electrophoresis, or the like.

The operating device 160 is a button, a switch, or the like that receives an operation input from the user. The operating device 160 may be realized by a hardware input device, such as a switch or a keyboard, or a touch panel integrated with the display device 150. In such a case, the scheme for detecting an input on the touch panel may be any typical detection scheme, such as a resistive film, infrared, electromagnetic induction, or capacitance scheme.

The operating device 160 according to this embodiment include a hardware input device and a touch panel of the display device 150, which can be individually operated.

The communicating device 170 communicates with other devices. For example, the communicating device 170 has an interface connectable to a network and is able to communicate with other devices via a wired or wireless local area network (LAN). Note that the communicating device 170 may send and receive image data to and from other devices, such as a universal serial bus (USB) memory, via a USB interface. The communicating device 170 is connectable with a communication network, such as a public line network, a LAN, or the Internet. The communicating device 170 is also able to send a compressed file to an external device via a communication network by a communication method such as a facsimile or an electronic mail.

The configuration illustrated in FIG. 2 includes at least a controller and a storage, and may have any configuration that is able to realize the operation according to this embodiment. Some functions may be provided by an external device. For example, the display device 150 may be a connected display device.

Alternatively, some functions may be provided by hardware or software. The information stored in the storage 120 may be the information stored on the cloud.

The image forming apparatus 10 may further have necessary functions in addition to the above-mentioned configuration. For example, the image forming apparatus 10 may include a billing management unit. In this way, the image forming apparatus 10 may be operable only when a fee is paid by the user.

Double-Sided Printing Process Operation

The operation of double-sided printing (double-sided copy) by the image forming apparatus 10 will now be described. The process is executed by the display processor 101 and the image forming processor 102 of the controller 100 when any one of the various functions, for example, the copy function in the drawing is selected by the user.

Figure 3:
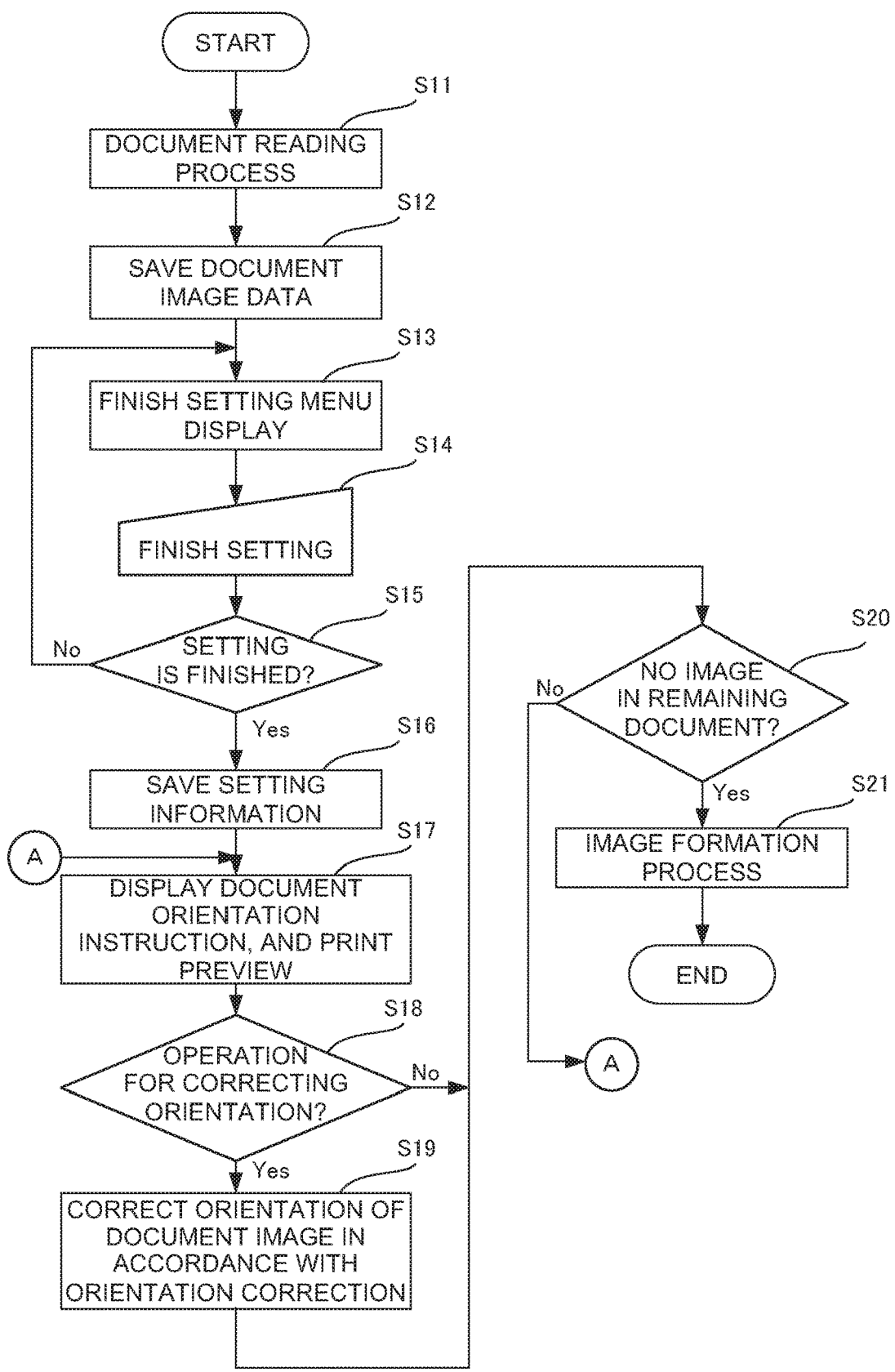
FIG. 3 is a flowchart illustrating the operation of the image forming apparatus according to the first embodiment.

FIG. 3 is a flowchart illustrating the double-sided copy process performed by the image forming apparatus 10.

The image forming processor 102 of the controller 100 performs a document reading process (step S11). Although not explained in detail, the process includes displaying a document reading instruction on the display device 150, placing a document on the document reader 130 by the user, reading an image of the document by the document reader 130, and generating document image data.

The image forming processor 102 temporarily stores the document image data 122 in the storage 120 (step S12).

The controller 100 proceeds to a finish setting process. The display processor 101 of the controller 100 retrieves the display data 124 of the finish settings from the display information in the storage 120 and displays the retrieved display data 124 on the display device 150 (see FIG. 4).

Figure 4:
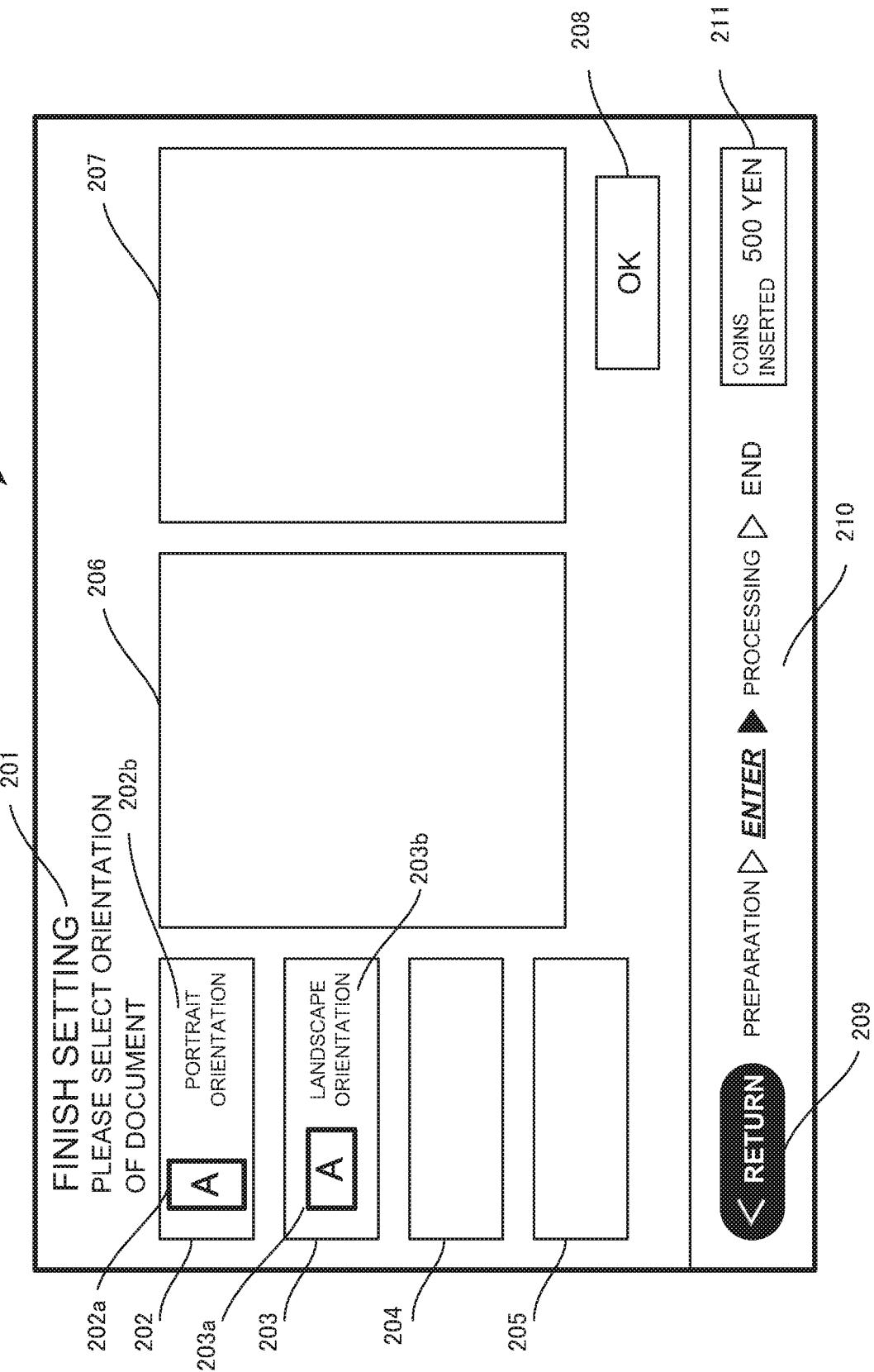
FIG. 4 is a diagram illustrating a document orientation setting selection menu on a display device of the image forming apparatus according to the first embodiment.

The display menu configuration of the display device 150 illustrated in FIG. 4 includes operation content pane 201, document orientation setting panes 202 and 203, binding position setting panes 204 and 205, document image operation panes 206 and 207, an OK button 208, a return button 209, a process progression pane 210, and an input amount money pane 211.

In step S13, the setting item "FINISH SETTINGS" and an instruction to the user "PLEASE SELECT ORIENTATION OF DOCUMENT" are displayed in the operation content pane 201. An icon 202a indicating the portrait orientation of the document and characters 202b corresponding to "PORTRAIT ORIENTATION" are displayed in the document orientation setting pane 202.

An icon 203a indicating the landscape orientation of the document and characters 203b corresponding to "LANDSCAPE ORIENTATION" are displayed in the document orientation setting pane 203.

At this time, the document orientation setting panes 202 and 203 may be colored or may blink so that the user is able to readily recognize the document orientation setting panes 202 and 203 as selectable components.

Figure 5:
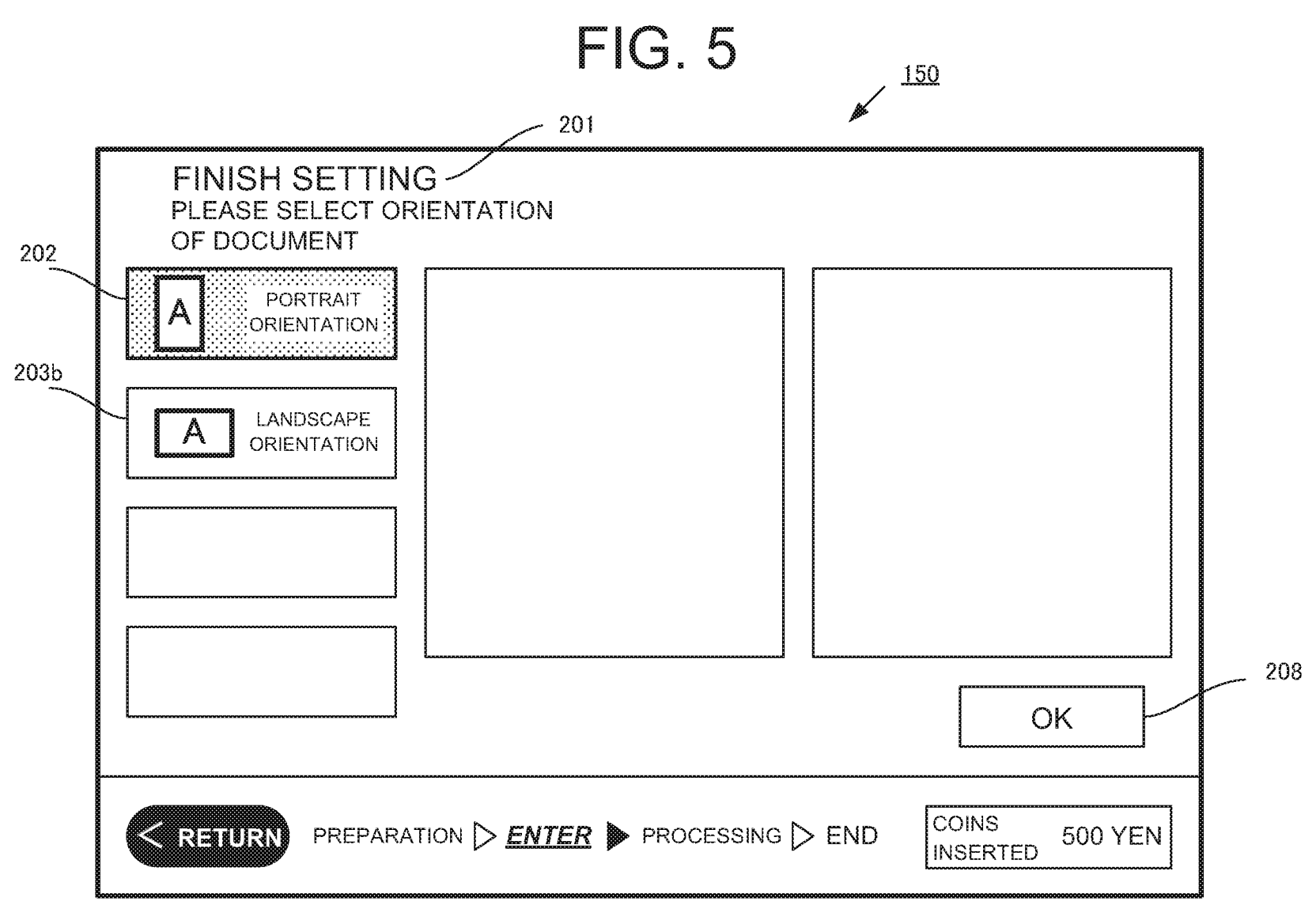

The user views the menu on the display device 150 and sets the orientation of the document using the operating device 160 (step S14). For example, when the user touches the portrait document orientation setting pane 202, the pane becomes active to indicate that the portrait document orientation setting pane 202 has been selected, as illustrated in FIG. 5. Selecting the portrait document orientation setting pane 202 confirms the document orientation to be a "PORTRAIT ORIENTATION". When the document orientation is to be changed, the landscape document orientation setting pane 203 is touched to activate the pane and deactivate the portrait document orientation setting pane 202. In this way, the landscape document orientation setting pane 203 is selected.

Figure 6:
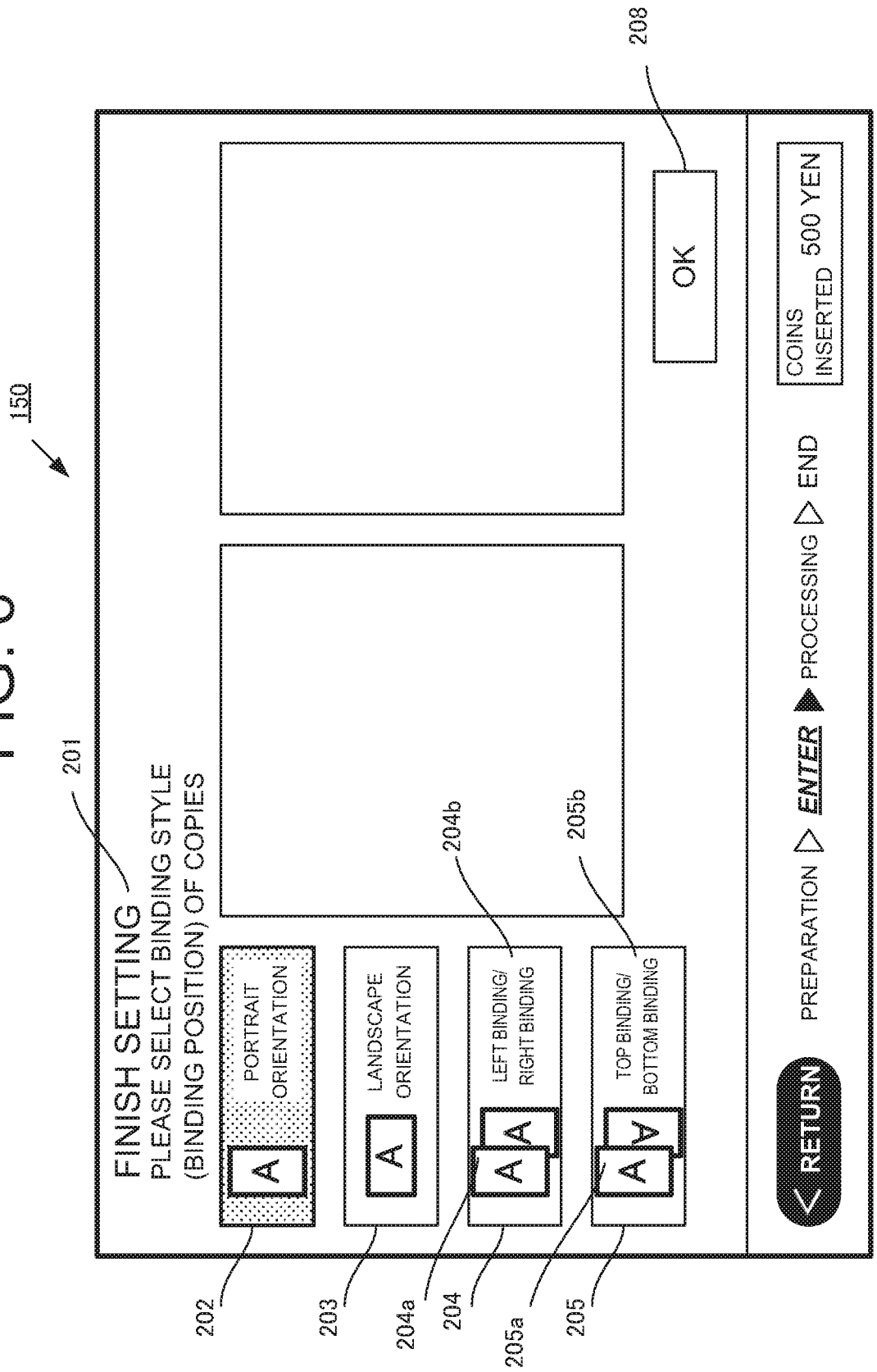
FIG. 6 is a diagram illustrating a binding position setting selection menu on the display device of the image forming apparatus according to the first embodiment.

The display processor 101 of the controller 100 causes the process to return to step S13 because the finish setting operation has not been completed (step S15; No), and displays the binding position setting panes 204 and 205 as illustrated in FIG. 6. At this time, the binding position setting panes 204 and 205 may be colored or may blink so that the user is able to readily recognize the binding position setting panes 204 and 205 as selectable components.

The binding position setting pane 204 for left binding/right binding includes an icon 204a illustrating front and back sides of the document facing the same direction in an overlapping state, and a character string 204b corresponding to "LEFT BINDING/RIGHT BINDING". Since the binding position is on the left side of the document or the right side of the document, it is necessary to print the front and back sides of the document in the same direction. Note that, alternatively, the icon 204a may be an animation indicating that the front and back sides of the document face the same direction by rotating the document in the horizontal direction (left-right direction).

The binding position setting pane 205 for top binding/bottom binding includes an icon 205a illustrating front and back sides of the document facing the opposite direction in the top-bottom direction in an overlapping state, and the character string 205b corresponding to "TOP BINDING/BOTTOM BINDING". Since the binding position is on the top side of the document or the bottom side of the document, it is necessary to print the front and back sides of the document in opposite directions in the top-bottom direction. Note that, alternatively, the icon 205a may be an animation indicating that the front and back sides of the document face the opposite directions by rotating the document in the vertical direction (top-bottom direction).

Figure 7:
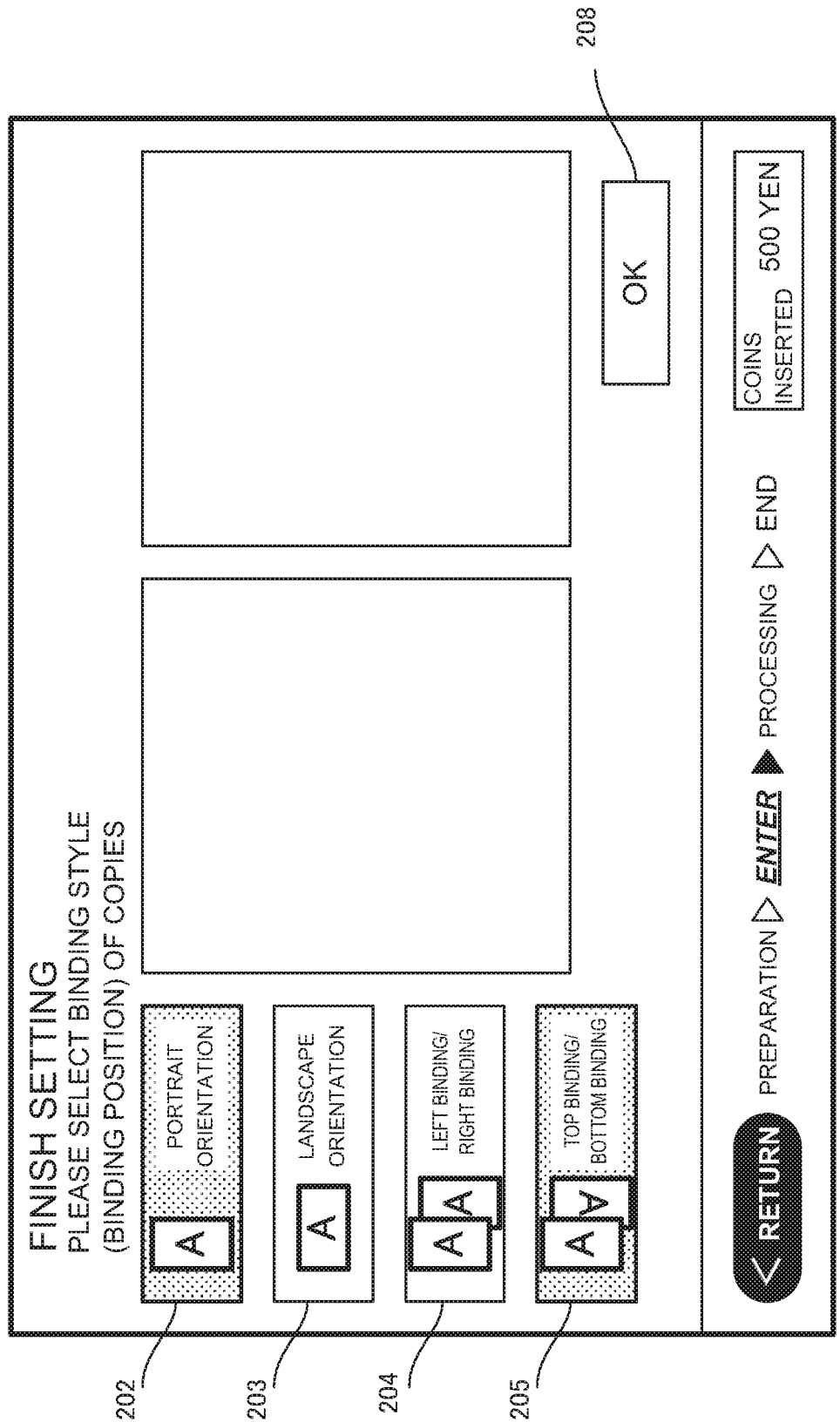
FIG. 7 is a diagram illustrating a binding position setting determination menu on the display device of the image forming apparatus according to the first embodiment.

For example, when the user touches the binding position setting pane 205 for top binding/bottom binding, the pane becomes active to indicate that the binding position setting pane 205 for top binding/bottom binding has been selected, as illustrated in FIG. 7. When the binding position setting pane 205 is selected, "TOP BINDING/BOTTOM BINDING" is confirmed as the binding position setting. Note that, when the binding position is to be changed, the binding position setting pane 204 for left binding/right binding is touched to activate the pane and deactivate the binding position setting pane 205 for top binding/bottom binding. In this way, the binding position setting pane 204 for left binding/right binding is selected.

Since the image forming processor 102 of the controller 100 finishes the finish settings (step S15; Yes), the setting information 123 is stored in the storage 120 in step S16.

Figure 8:
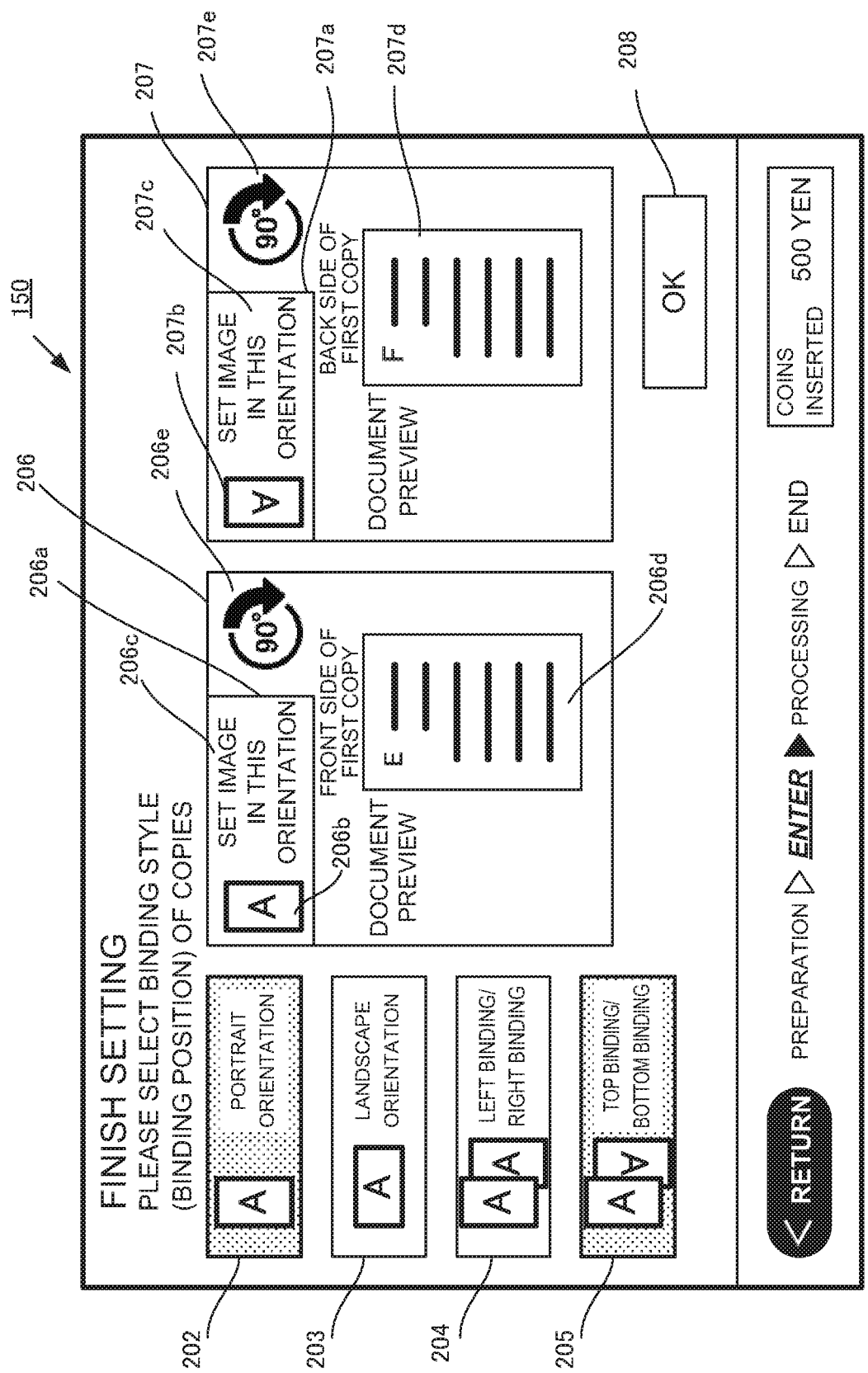
FIG. 8 is a diagram illustrating a menu for a document image operating pane on the display device of the image forming apparatus according to the first embodiment.

The display processor 101 of the controller 100 displays the document image operating panes 206 and 207, as illustrated in FIG. 8, on the basis of the document image data 122, the setting information 123, and the display data 124, which are stored in the storage 120.

The document image operating pane 206 is displayed for operating the image to be printed on the front side of the sheet. The document image operating pane 207 is displayed for operating the image to be printed on the back side of the sheet.

Figure 9:
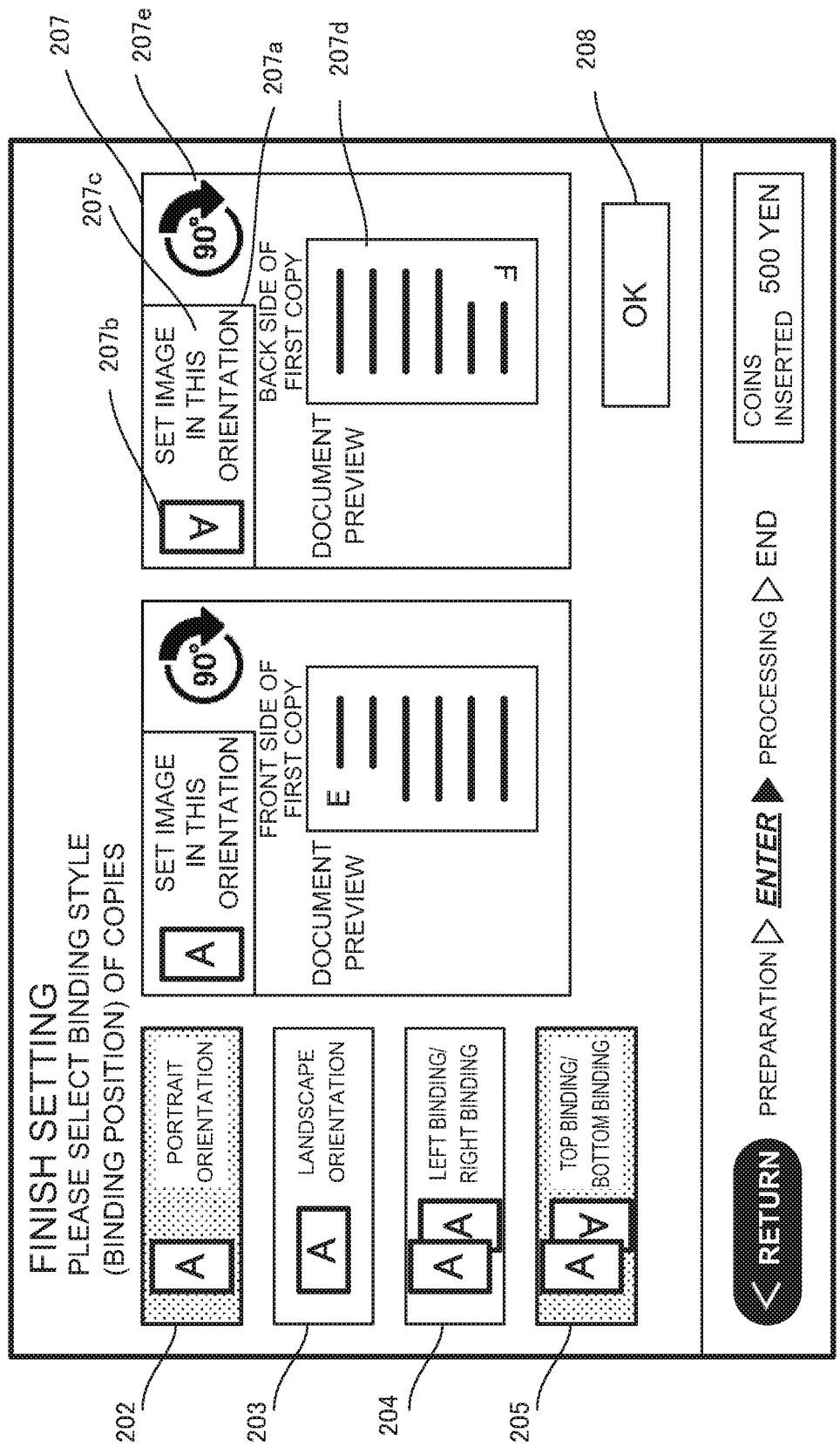
FIG. 9 is a diagram illustrating a menu after operation of the document image operating pane on the display device of the image forming apparatus according to the first embodiment.

FIGS. 8 and 9 illustrate the first document image. As the process proceeds, images indicating printing on the front and back sides of the subsequent sheets are displayed one after another.

The front and back sides are displayed as a pair. Alternatively, the front and back sides may be displayed separately for each sheet, or the front and back sides of multiple sheets may be displayed together.

The document image operating panes 206 and 207 includes document orientation instructing panes 206a and 207a, print preview images 206d and 207d based on the read document images, and 90-degree rotation operation icons 206e and 207e.

The document orientation instructing panes 206a and 207a are displayed to instruct the user about the correct document orientation on the basis of the finish setting information 123 set by the user. The document orientation instructing panes 206a and 207a respectively include document orientation instruction icons 206b and 207b and character strings 206c and 207c corresponding to "SET IMAGE IN THIS ORIENTATION".

By displaying both the icons indicating the orientation and the characters describing the icons, the user can immediately grasp the orientation of the document. Here, a combination of icons and characters is displayed, but is not limited thereto. Alternatively, only one of these may be displayed. The icon may be any one that can indicate the orientation of the document. For example, the icon may be a symbol, such as an arrow, that indicates the orientation. Besides an icon, an image of a document clearly indicating the orientation of the document may be used.

The display processor 101 of the controller 100 extracts data such as images and characters from the display data 124 stored in the storage 120 on the basis of the setting information 123 stored in the storage 120, and displays the document orientation instructing panes 206a and 207a and the 90-degree rotation operation icons 206e and 207e in the document image operating panes 206 and 207 on the display device 150. The display processor 101 displays the print preview images 206d and 207d based on the document image data 122 (step S17).

As long as the print orientation of the document image is indicated, the print preview image may be a reduced image of the original image without a reduction in image quality, a reduced image with low image quality sufficient to indicate the print orientation, or a partially enlarged image that sufficiently indicates the print orientation. Alternatively, the print preview image may be a symbol or the like that indicates the print orientation. An explanation in text may be added to the print preview image.

In FIG. 8, it is visually apparent that the orientation of a document orientation indication icon 207b differs from the orientation of a print preview image 207d. Therefore, the user rotates the print preview image 207d by 180 degrees to match the orientation of the document indicated by document orientation indication icon 207b. In such a case, the user touches the 90-degree rotation operation icon 207e twice (in the case of a double-sided setting, a 180-degree rotation operation icon may be provided in place of the 90-degree rotation operation icon 207e so as to achieve a 180-degree rotation by touching the icon once). As illustrated in FIG. 9, the display processor 101 of the controller 100 displays the print preview image 207d by rotating it by 180 degrees. If the 180-degree rotation is sufficient, the user touches the OK button 208 to determine the content of the operation of correcting by the operating device 160. The display processor 101 of the controller 100 determines that an orientation operation of correcting has been performed (step S18; Yes), and corrects the orientation of the document image data stored in the storage 120 in accordance with the orientation correction (step S19).

When the OK button 208 is touched without correction, the display processor 101 of the controller 100 determines that the orientation operation of correcting has not been performed (step S18; No), and causes the process to proceed to step S20.

The display processor 101 of the controller 100 confirms whether or not there is document image data 122 that has not been subjected to the display process remaining in the storage 120 (step S20). If there is remaining image data, the display processor 101 causes the process to return to step S17. If there is no remaining image data, the process proceeds to step S21. The image forming processor 102 of the controller 100 causes the image forming device 140 to perform an image forming process (double-sided printing process) on the basis of the document image data 122 of the storage 120 (step S21).

In this way, the display device 150 of the image forming apparatus 10 displays an instruction on the correct document orientation and the read image. Therefore, the user can immediately recognize whether the document has been read in the correct orientation. Furthermore, the orientation of the read document image can be corrected while viewing the display device 150. Therefore, the document needs not to be reread from the beginning. This streamlines the operations and eliminates unnecessary costs.

In this operation process, the final print form is not confirmed. Alternatively, a print preview image displaying the final print form of the document may be displayed to allow the user to make a final confirmation. If the document orientation is incorrect at this stage, the orientation may be corrected on the displaying.

For example, if the orientation of the back sides of all documents is incorrect in the same direction, the orientation may be corrected in a batch.

Modification of First Embodiment

Figure 10:
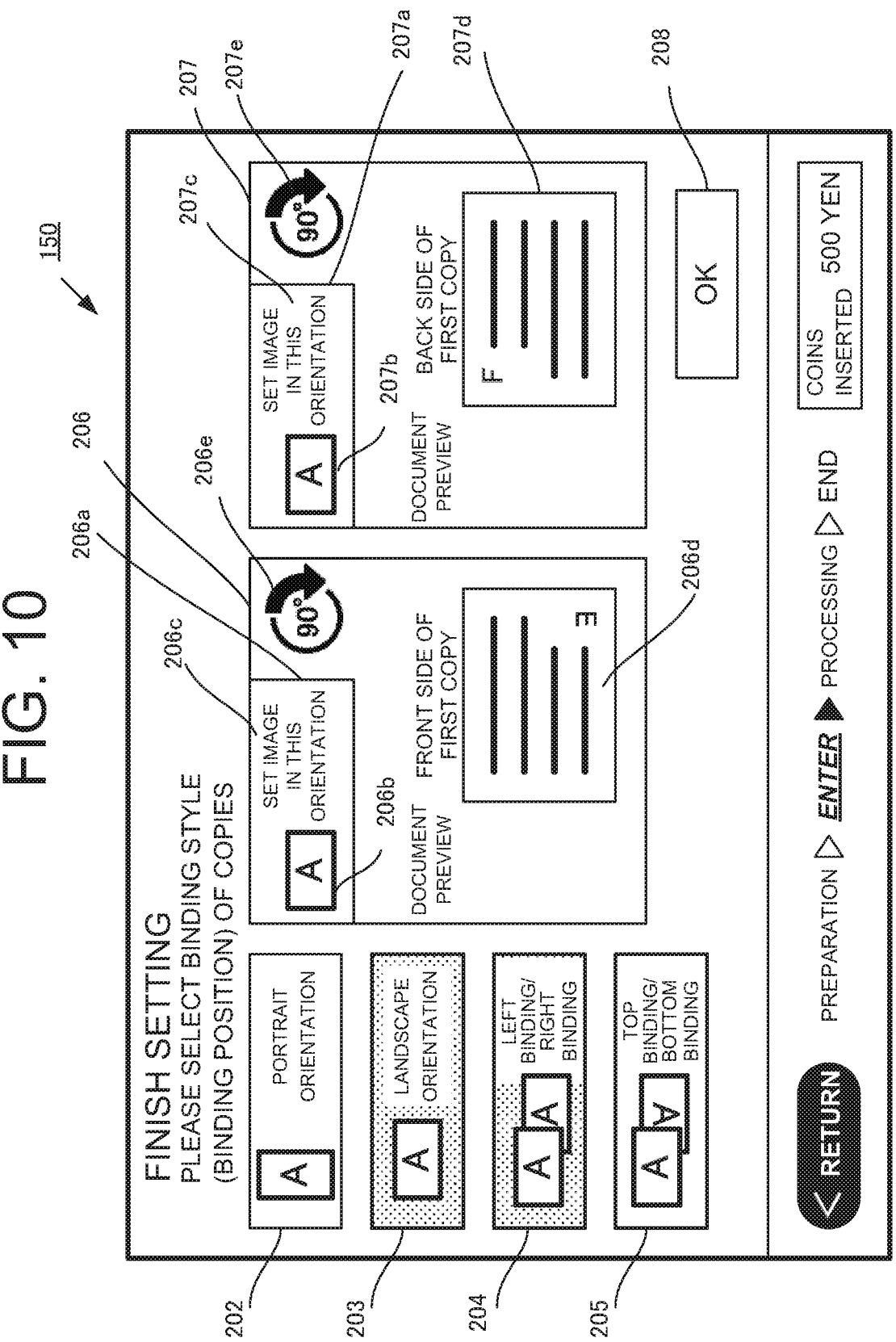
FIG. 10 is a diagram illustrating another menu for the document image operating pane on the display device of the image forming apparatus according to the first embodiment.
Figure 11:
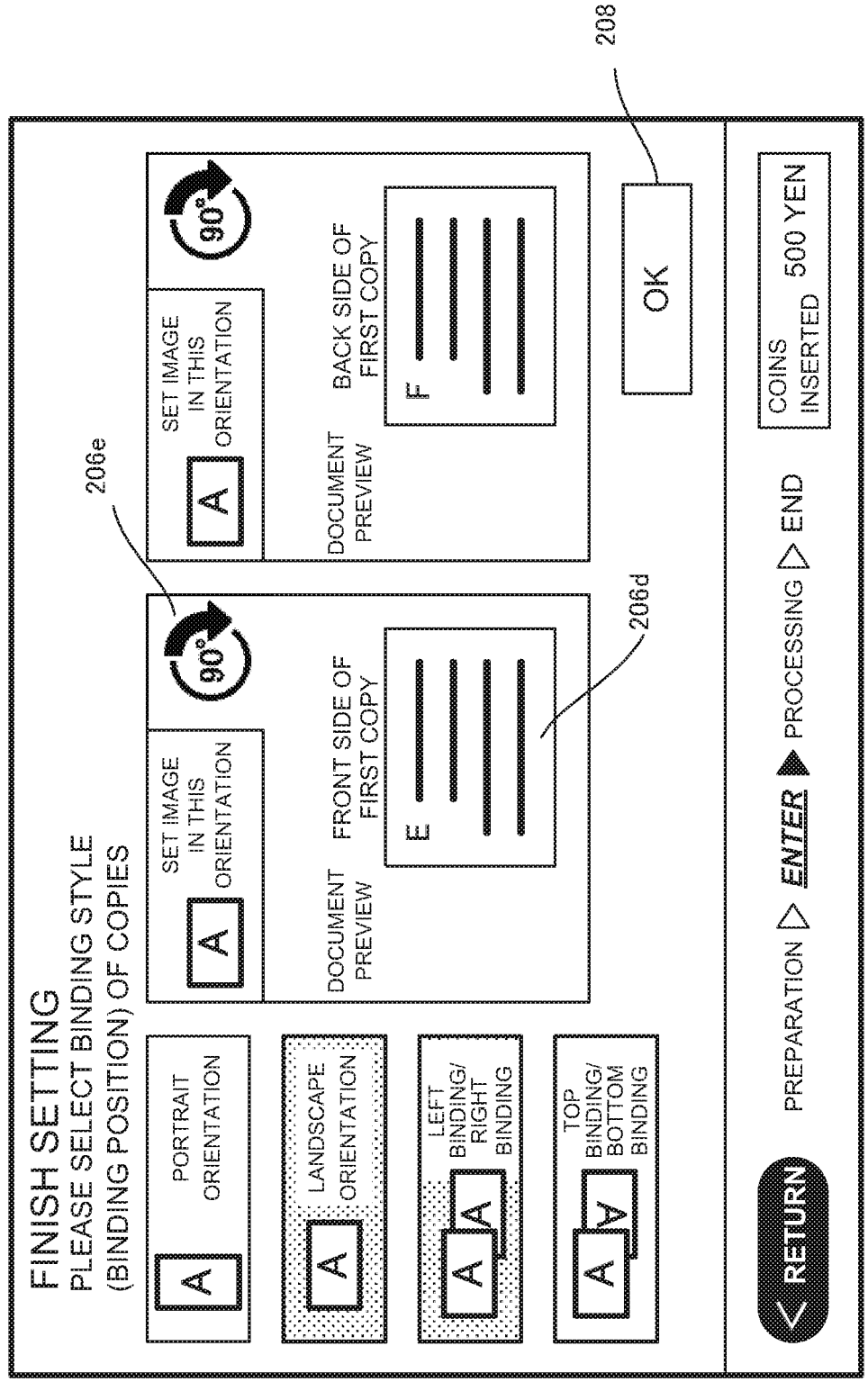
FIG. 11 is a diagram illustrating another menu after operation of the document image operating pane on the display device of the image forming apparatus according to the first embodiment.

FIGS. 10 and 11 illustrate a modified example of the first embodiment.

In the finish settings for double-sided printing in this modified example, the landscape document orientation setting pane 203 is selected for the document orientation setting, and the left binding/right binding position setting pane 204 is selected for the binding position setting.

In the document image operating pane 206 in this example, the orientation of the document orientation instructing pane 206a does not match the orientation of the print preview image 206d. The user rotates the print preview image 206d by 180 degrees by touching the 90-degree rotation operation icon 206e twice, as illustrated in FIG. 11. As a result, the document image data stored in the storage 120 is also rotated by 180 degrees through processing. Therefore, double-sided printing is performed in the correct orientation.

The processing described above is the same as the processing described in the first embodiment. Therefore, a detailed description thereof will be omitted.

Second Embodiment

Figure 12:
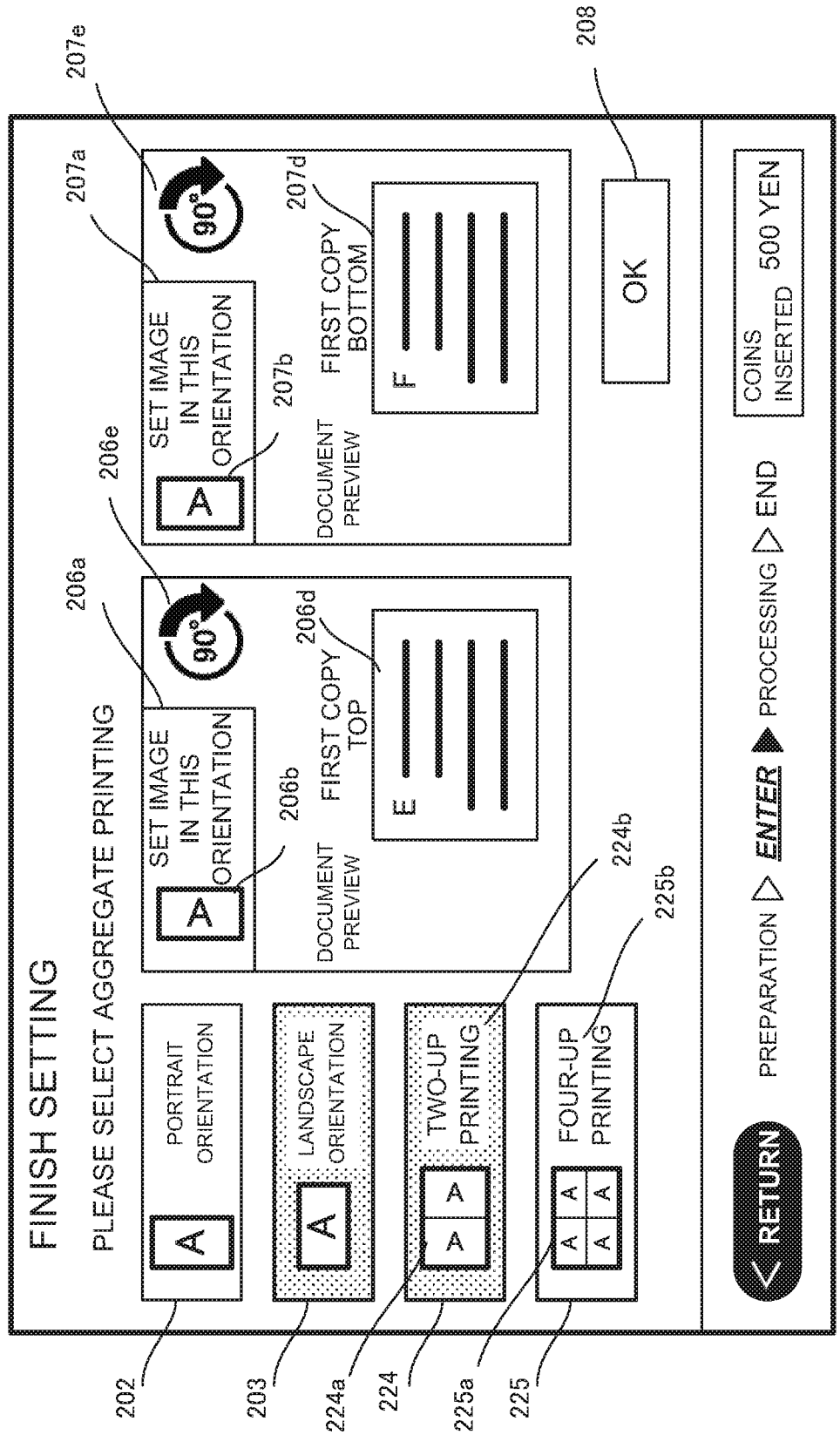
FIG. 12 is a diagram illustrating a menu for a document image operating pane on a display device of an image forming apparatus according to a second embodiment.

FIGS. 12 and 13 are diagrams illustrating a display device 150 of an image forming apparatus 10 according to a second embodiment. The second embodiment relates to aggregate printing in which images of multiple read documents are printed on one sheet. The operation of the aggregate print processing is the same as that in the flowchart in FIG. 3.

Steps S11 and S12 are the same as those in the first embodiment.

The finish setting menu in step S13 is as illustrated in FIG. 12. The second embodiment differs from the first embodiment in that aggregate printing setting panes 224 and 225 are provided. The aggregate printing setting panes 224 and 225 are for setting the number of read images to be printed on one sheet.

The aggregate printing setting pane 224, that is the N-up printing setting pane, corresponds to 2-up printing and includes an icon 224a and characters 224b corresponding to "TWO-UP PRINTING".

The N-up printing setting pane 225 corresponds to 4-up printing and includes an icon 225a and characters 225b corresponding to "FOUR-UP PRINTING".

In the finish settings by the user in steps S14, S15, and S16, the user has selected the landscape orientation and 2-up printing in the finish settings for the aggregate printing, as illustrated FIG. 12. On the basis of these settings, in step S17, the display processor 101 of the controller 100 displays the document image operating panes 206 and 207 on the display device 150. The document image operating pane 206 shows the print image of the top side of the sheet in 2-up printing, and the document image operating pane 207 shows the print image of the bottom side of the sheet in 2-up printing. Here, the user can immediately recognize that the orientations of the print preview images 206d and 207d do not match the orientations indicated by the icons 206b and 207b indicating the orientation of the document based on the settings. Therefore, the user touches the 90-degree rotation operation icons 206e and 207e once to rotate the print preview images 206d and 207d by 90 degrees in the clockwise direction, as illustrated in FIG. 13. This causes orientation of the print preview images 206d and 207d to match the orientation indicated by the icons 206b and 207b indicating the orientation of the document. The user then touches the OK button 208 to confirm the operation. Since an orientation operation of correcting has been performed in step S18, the display processor 101 of the controller 100 corrects the orientation of the document image data stored in the storage 120 to the same orientation in step S19. In this way, all the read document images are processed (step S20), and the printing process (image forming process) is performed in step S21.

In this way, the display device 150 of the image forming apparatus 10 displays an instruction on the correct document orientation and the read image. Therefore, the user can immediately recognize whether the document has been read in the correct orientation. Furthermore, the orientation of the read document image can be corrected while viewing the display device 150. Therefore, the document needs not to be reread from the beginning. This streamlines the operations and eliminates unnecessary costs.

DESCRIPTION OF REFERENCE NUMERALS 100 controller
120 storage
121 control program
122 document image data
123 setting information
124 display data
130 document reader
140 image forming device
150 display device
160 operating device
170 communicating device
202, 203 document orientation setting pane
204, 205 binding position setting pane
206, 207 document image operating pane
206a, 207a document orientation instructing pane
206b, 207b document orientation instruction icon
206c, 207c character string
206d, 207d print preview image
206e, 207e 90-degree rotation operation icon
208 OK button
224, 225 Aggregate printing setting pane

What is claimed is:

1. An image forming apparatus comprising:
    a reader that reads a document and generates document image data;
    an operating device that performs a finish setting for setting of an orientation of a document image in accordance with the orientation of the document and a binding position and performs an operation for correcting the orientation of the document image;
    a display device that performs displaying of a document orientation instruction for instructing the orientation of the document image to be printed and performs displaying of a print preview image for indicating the orientation of the document image;
    an image forming device that forms an image based on the document image data on a recording sheet in the orientation of the document image indicated by the print preview image; and
    a controller that controls the display device and the image forming device in accordance with an operation input from the operating device, wherein the controller causing the display device to perform the displaying of the document orientation instruction corresponding to the finish setting set by the operating device and to display the print preview image.

2. The image forming apparatus according to claim 1, wherein when an operation of correcting the orientation of the print preview image is performed on the display device by the operating device, the controller corrects the orientation of the print preview image in accordance with the operation of correcting, displays the print preview image, and corrects the orientation of the document image data.

3. The image forming apparatus according to claim 1, wherein the displaying of the document orientation instruction includes an icon indicating the document orientation.

4. The image forming apparatus according to claim 1, wherein the displaying of the document orientation instruction includes a combination of an icon indicating the document orientation and characters describing the document orientation.

5. The image forming apparatus according to claim 1, wherein the finish setting includes a setting related to a double-sided printing finish.

6. The image forming apparatus according to claim 1, wherein the finish setting includes a setting related to an aggregate printing finish.

7. A method of displaying a setting of an image forming apparatus including a reader that reads a document and generates document image data; an operating device that performs a finish setting for setting of an orientation of a document image in accordance with the orientation of the document and a binding position and performs an operation for correcting the orientation of the document image; a display device that performs displaying of a document orientation instruction for instructing the orientation of the document image to be printed and performs displaying of a print preview image for indicating the orientation of the document image; an image forming device that forms an image based on the document image data on a recording sheet in the orientation of the document image indicated by the print preview image; and a controller that controls the display device and the image forming device in accordance with an operation input from the operating device, the method comprising:

causing, by the controller, the display device to perform the displaying of the document orientation instruction corresponding to the finish setting set by the operating device and to display the print preview image.

8. The method of displaying a setting of the image forming apparatus, according to claim 7, the method further comprising:

when an operation of correcting the orientation of the print preview image is performed on the display device by the operating device, correcting the orientation of the print preview image in accordance with the operation of correcting by the controller, displaying the print preview image by the controller, and correcting the orientation of the document image data by the controller.

* * * * *